(12) United States Patent
Chang et al.

(10) Patent No.: US 12,375,111 B2
(45) Date of Patent: Jul. 29, 2025

(54) TRANSMITTER CIRCUIT, COMPENSATION VALUE CALIBRATION DEVICE AND METHOD FOR CALIBRATING COMPENSATION VALUES

(71) Applicant: Realtek Semiconductor Corp., HsinChu (TW)

(72) Inventors: Yuan-Shuo Chang, HsinChu (TW); Tzu-Ming Kao, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 368 days.

(21) Appl. No.: 18/140,617

(22) Filed: Apr. 28, 2023

(65) Prior Publication Data

US 2024/0022272 A1    Jan. 18, 2024

(30) Foreign Application Priority Data

Jul. 18, 2022 (TW) .................................. 111126834

(51) Int. Cl.
| | |
|---|---|
| *H04B 1/04* | (2006.01) |
| *H04B 1/12* | (2006.01) |
| *H04B 1/30* | (2006.01) |
| *H04B 17/11* | (2015.01) |
| *H04B 17/21* | (2015.01) |

(52) U.S. Cl.
CPC ......... *H04B 1/0475* (2013.01); *H04B 1/0458* (2013.01); *H04B 2001/0433* (2013.01)

(58) Field of Classification Search
None
See application file for complete search history.

(56) References Cited

U.S. PATENT DOCUMENTS

| | | | | |
|---|---|---|---|---|
| 8,514,019 B2* | 8/2013 | Okazaki | ................ | H03F 1/3247 |
| | | | | 330/149 |
| 8,559,488 B1* | 10/2013 | Smaini | ..................... | H04B 1/40 |
| | | | | 375/259 |
| 9,276,798 B2* | 3/2016 | Yu | ......................... | H04L 27/364 |
| 11,626,897 B2* | 4/2023 | Kao | ..................... | H04B 1/0039 |
| | | | | 455/75 |

(Continued)

FOREIGN PATENT DOCUMENTS

TW    I761186 B    4/2022

*Primary Examiner* — Pablo N Tran
(74) *Attorney, Agent, or Firm* — Winston Hsu (57) ABSTRACT

A method for calibrating compensation values utilized by a compensation device in a transmitter includes: obtaining a plurality of output signals sequentially generated by the transmitter by processing a pair of input signals based on a plurality of pairs of compensation values as a plurality of feedback signals, where each feedback signal corresponds to one of the plurality of pairs of compensation values; obtaining a signal component of the feedback signals at a predetermined frequency as a portion of the feedback signals; determining a pair of equivalent impairment parameters in a calibration operation according to the plurality of pairs of compensation values and the portion of the feedback signals; and determining a pair of calibrated compensation values according to the pair of equivalent impairment parameters and providing the pair of calibrated compensation values to the compensation device.

15 Claims, 5 Drawing Sheets

(56) References Cited

U.S. PATENT DOCUMENTS

| | | | |
|---|---|---|---|
| 11,671,131 B2* | 6/2023 | Kao | H04B 17/24 |
| | | | 455/552.1 |
| 11,764,815 B2* | 9/2023 | Kao | H04B 17/11 |
| | | | 375/296 |
| 2014/0348265 A1* | 11/2014 | Wang | H03F 3/2178 |
| | | | 375/297 |
| 2015/0214987 A1* | 7/2015 | Yu | H04B 1/0475 |
| | | | 375/297 |
| 2016/0173317 A1* | 6/2016 | Bitton | H04L 27/364 |
| | | | 455/114.2 |
| 2017/0093346 A1* | 3/2017 | Matsubara | H03F 1/32 |
| 2017/0194990 A1* | 7/2017 | Wang | H04L 27/0014 |
| 2019/0097866 A1* | 3/2019 | Sestok, IV | H04L 27/3863 |
| 2022/0052717 A1* | 2/2022 | Cao | H03F 3/245 |

* cited by examiner

TRANSMITTER CIRCUIT, COMPENSATION VALUE CALIBRATION DEVICE AND METHOD FOR CALIBRATING COMPENSATION VALUES

BACKGROUND OF THE INVENTION

1. Field of the Invention

The invention relates to a method for calibrating compensation values used in a transmitter circuit to reduce the RF impairment of the transmitter circuit.

2. Description of the Prior Art

There is a performance limitation of IQ imbalance in the design of a Zero Intermediate Frequency (Zero-IF) transmitter or zero-IF receiver because only one mixing stage is utilized to directly convert the baseband signal to radio frequency signal or only one mixing stage is utilized to directly convert the received RF signal to the baseband signal. The reason of causing the IQ imbalance is that when there is some difference in the in-phase channel response and the quadrature-phase channel response, the two signals passing through the in-phase channel and the quadrature-phase channel will have unequal amplitude or phase gain.

To solve the problem of IQ imbalance existing in a zero-IF transmitter or a zero-IF receiver, a method and a corresponding transmitter circuit to effectively calibrate the IQ imbalance compensation values are required.

SUMMARY OF THE INVENTION

It is an object of the invention to provide a method for calibrating IQ imbalance compensation values and the transmitter circuit utilizing the same, so as to solve the problem of IQ imbalance in the Zero-IF transmitter or zero-IF receiver, and as compared to the existing technology, the optimal compensation values are found more quickly in the calibration operation.

According to an embodiment of the invention, a transmitter circuit comprises a compensation device, at least one transmitting signal processing device and a digital signal processor. The compensation device is disposed on a transmitting signal processing path and configured to sequentially process a pair of input signals according to a plurality of pairs of compensation values to generate a plurality of pairs of compensated signals. The at least one transmitting signal processing device is disposed on the transmitting signal processing path and configured to sequentially process the plurality of pairs of compensated signals to generate a plurality of output signals. The digital signal processor is disposed on a feedback signal processing path and coupled to the compensation device. The feedback signal processing path is coupled to an output terminal of the transmitting signal processing path. The plurality of output signals are provided to the digital signal processor through the feedback signal processing path as a plurality of feedback signals. The digital signal processor performs a calibration operation according to the plurality of pairs of compensation values and the plurality of feedback signals. In the calibration operation, the digital signal processor determines a pair of equivalent impairment parameters according to the plurality of pairs of compensation values and the plurality of feedback signals, determines a pair of calibrated compensation values according to the pair of equivalent impairment parameters and provides the pair of calibrated compensation values to the compensation device.

According to an embodiment of the invention, a compensation value calibration device for calibrating one or more compensation values utilized by a compensation device in a transmitter comprises a Fast Fourier Transform (FFT) device and a digital signal processor. The FFT device is configured to perform Fast Fourier transform on a plurality of feedback signals received from the transmitter to generate a plurality of frequency domain feedback signals, wherein each feedback signal corresponds to one of a plurality of pairs of compensation values. The digital signal processor is coupled to the compensation device and the FFT device and configured to determine a pair of calibrated compensation values in a calibration operation according to the plurality of pairs of compensation values and the plurality of frequency domain feedback signals and provide the pair of calibrated compensation values to the compensation device. the digital signal processor obtains a signal component of the plurality of feedback signals at a predetermined frequency as a portion of the plurality of feedback signals according to the plurality of frequency domain feedback signals, determines a pair of equivalent impairment parameters according to the plurality of pairs of compensation values and the portion of the plurality of feedback signals and determines the pair of calibrated compensation values according to the pair of equivalent impairment parameters.

According to an embodiment of the invention, a method for calibrating one or more compensation values utilized by a compensation device in a transmitter comprises: obtaining a plurality of output signals sequentially generated by the transmitter by processing a pair of input signals according to a plurality of pairs of compensation values as a plurality of feedback signals, wherein each feedback signal corresponds to one of the plurality of pairs of compensation values; obtaining a signal component of the plurality of feedback signals at a predetermined frequency as a portion of the plurality of feedback signals; determining a pair of equivalent impairment parameters in a calibration operation according to the plurality of pairs of compensation values and the portion of the plurality of feedback signals; and determining a pair of calibrated compensation values according to the pair of equivalent impairment parameters and providing the pair of calibrated compensation values to the compensation device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
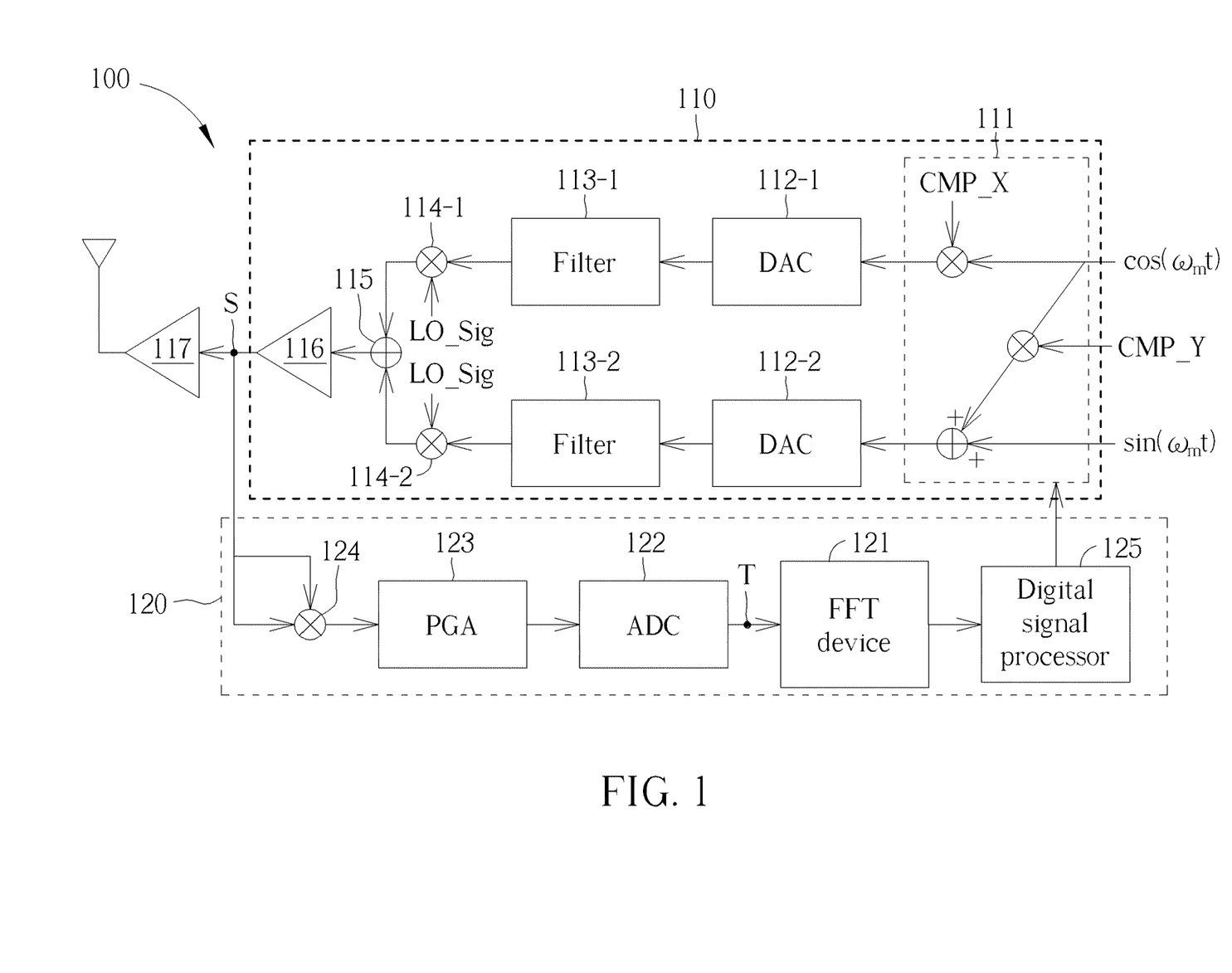
FIG. 1 shows an exemplary transmitter circuit according to an embodiment of the invention.

FIG. 1 shows an exemplary transmitter circuit according to an embodiment of the invention. The transmitter circuit 100 may comprise a transmitting signal processing path 110 and a feedback signal processing path 120. The transmitting signal processing path 110 may comprise a plurality of stages of transmitting signal processing devices configured to process the transmitting signal, as an example, converting a baseband signal to a radio frequency signal. According to an embodiment of the invention, the transmitting signal processing path 110 may comprise a compensation device 111, Digital to Analog Converters (DAC) 112-1 and 112-2, filters 113-1 and 113-2 and mixers 114-1 and 114-2 which are respectively disposed on the in-phase channel and the quadrature-phase channel, and an adder 115 and a buffer circuit 116.

The compensation device 111 is disposed on the transmitting signal processing path 110. The compensation device 111 may be configured to receive a pair of input signals comprising a first signal provided to the in-phase channel (I) and a second signal provided to the quadrature-phase channel (Q), perform compensation on the received signals to compensate for the IQ imbalance and thereby generating compensated signals according to a pair of compensation values CMP_X and CMP_Y, wherein the compensation values CMP_X and CMP_Y may respectively be the compensation values provided for compensating for the IQ imbalance in the amplitude or the phase on the in-phase channel and the quadrature-phase channel. As an example, the compensation device 111 may multiply the input signal on the in-phase channel (I) and the compensation value CMP_X together, and multiply the input signal on the in-phase channel (I) and the compensation value CMP_Y together and then add the input signal on the quadrature-phase channel (Q) to the multiplied signal, so as to compensate for the IQ imbalance on the transmitting signal processing path 110. According to an embodiment of the invention, the compensation values CMP_X and CMP_Y are real numbers.

The DAC 112-1 and the DAC 112-2 on the in-phase channel and the quadrature-phase channel are respectively configured to convert a plurality of input signals that have been compensated from digital domain to analog domain. The filter 113-1 and filter 113-2 are respectively configured to perform filtering on the received signals. The mixer 114-1 and mixer 114-2 are respectively configured to multiply the received signals with an oscillating signal LO Sig to convert the received signals from baseband to radio frequency signals. The oscillating signal LO Sig provided to the mixer 114-1 and mixer 114-2 is a collective representation of two signals having the same frequency and quadrature in phase. In the embodiments of the invention, the oscillating signal LO Sig has an oscillating frequency LO. The adder 115 is configured to combine the signal on the in-phase channel and the signal on the quadrature-phase channel. The buffer circuit 116 may be a driving circuit of the power amplifier 117 to buffer the received radio frequency signal and drive the power amplifier 117 in the subsequent stage. The power amplifier 117 is configured to amplify the radio frequency signal before it is sent out through the antenna.

In the embodiments of the invention, the feedback signal processing path 120 may comprise a plurality of feedback signal processing devices, such as a mixer 124, a Programmable Gain Amplifier (PGA) 123, an Analog to Digital Converter (ADC) 122, a Fast Fourier Transform (FFT) device 121 and a digital signal processor 125. The feedback signal processing path 120 may be coupled to an output terminal of at least one transmitting signal processing device, for example, an output terminal of the buffer circuit 116, to receive an output signal generated by the transmitting signal processing device from the output terminal as a feedback signal and process the feedback signal. The output signal is a signal that have been processed by the transmitting signal processing devices, including the signal processing respectively performed on the in-phase channel and the quadrature channel. The mixer 124 is configured to multiply the received feedback signal with itself to down convert the feedback signal to the baseband signal. The PGA 123 is configured to amplify (or, attenuate) the received feedback signal. The ADC 122 is configured to convert the feedback signal from analog domain to digital domain. The FFT device 121 is configured to perform FFT on the received feedback signal so as to generate the feedback signal in frequency domain (hereinafter named as frequency domain feedback signal).

The digital signal processor 125 is coupled to the FFT device 121 and the compensation device 111 and is configured to perform a calibration operation according to the frequency domain feedback signal to calibrate one or more compensation values utilized by the compensation device 111. Compared with the existing technology, in the embodiments of the invention, the digital signal processor 125 is able to find the optimal compensation values CMP_X and CMP_Y which optimize the image rejection ratio (IMR) more quickly in the calibration operation.

Figure 2:
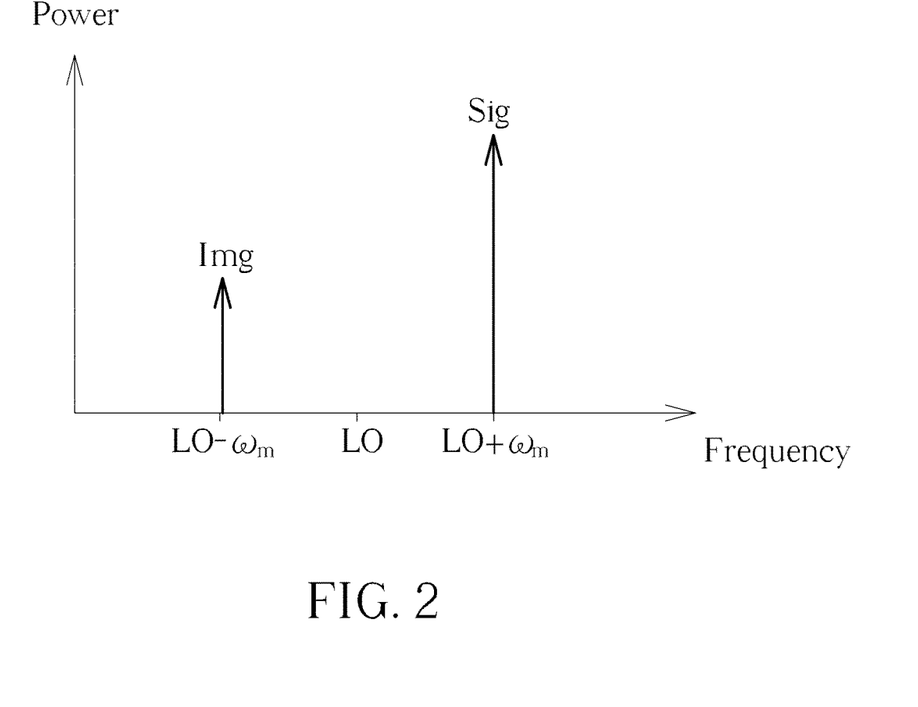
FIG. 2 shows an exemplary frequency spectrum of an RF signal.

FIG. 2 shows an exemplary frequency spectrum of an RF signal. The RF signal may be the one output by the buffer circuit 116 at the output terminal, such as the RF signal obtained at the node S. Suppose that the input signal Sig represents a pair of single tone signals with angular frequency $\omega_m$, such as the pair of cosine signal cos $\omega m_t$ and the sine signal sin $\omega_m t$ having the angular frequency $\omega_m$ as shown in FIG. 1. Due to the IQ imbalance on the transmitting signal processing path, the spectrum of the RF signal generated on the transmitting signal processing path 110 contains not only the energy (or power) of the original signal Sig at frequency (Lo+$\omega_m$), but also the energy (or power) of the unwanted image signal Img at frequency (Lo−$\omega_m$).

Figure 3:
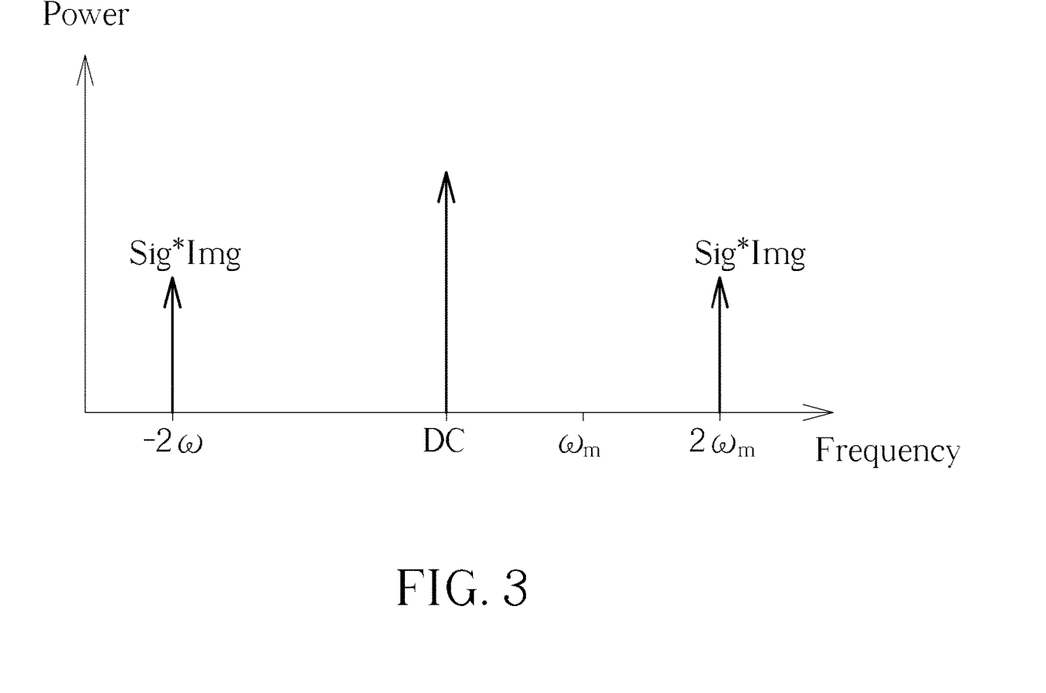
FIG. 3 shows an exemplary frequency spectrum of a feedback signal.

FIG. 3 shows an exemplary frequency spectrum of a feedback signal, which is the frequency spectrum obtained after performing the FFT transformation on the feedback signal by the FFT device 121. Due to the existence of the image signal Img, the signal generated after the feedback signal is processed by the mixer 124 has some energy (or power) that cannot be ignored at a frequency (±2$\omega_m$), such as the signal Sig*Img at the frequency (±2$\omega_m$) as shown in FIG. 3, whose energy (or power) is proportional to the value regarding a multiplication result of the corresponding amplitudes Sig*Img.

Therefore, according to an embodiment of the invention, the compensation device 111 may be configured to perform compensation on the received signals to compensate for the IQ imbalance according to a pair of compensation values CMP_X and CMP_Y, so as to reduce or minimize the energy of the image signal generated on the transmitting signal processing path, thereby solving the problem of IQ imbalance. When processing the RF impairment due to IQ imbalance, the compensation value calibration device may try to find out the pair of optimal compensation values which optimize the image rejection ratio (IMR) on the transmitting signal processing path 110 in the calibration operation. For example, the pair of compensation values which is able to increase the or even maximize the IMR on the transmitting signal processing path 110, and is also able to make a processed signal on the feedback signal processing path 120, as an example, the feedback signal generated after the signal processing of the mixer 124, PGA 123 or the ADC 122, to have minimum energy at a predetermined frequency. In other words, the pair of optimal compensation values is a pair of compensation values that make the signal component of the feedback signal to have minimum energy, wherein said signal component comprises the image signal.

In the embodiments of the invention, an absolute value of the aforementioned predetermined frequency may be twice the input frequency of the input signal. For example, when the angular frequency of a test signal is $\omega_m$, an absolute value of the predetermined frequency is twice the input frequency. Therefore, the predetermined frequency may be ($\pm 2\omega_m$). It is to be noted that the predetermined frequency may vary with the design of the mixer 124. As an example, when the mixer 124 is designed to multiply the feedback signal with a signal having another frequency different from $\omega_m$, the predetermined frequency is adjusted to another value, such as a result obtained by adding the input frequency and said another frequency or obtained by subtracting said another frequency from the input frequency.

The greater the difference between the energy (or power) of the RF signal at the frequency (LO+$\omega_m$) and the energy (or power) at the frequency (LO−$\omega_m$), the better the image rejection capability of the transmitter circuit 100. Therefore, the smaller energy (or power) of the feedback signal at the frequency ($\pm 2\omega_m$). In an embodiment of the invention, the digital signal processor 125 may be configured to find out the pair of optimal compensation values CMP_X and CMP_Y which optimize the image rejection ratio (IMR) in the calibration operation (that is, minimize the energy (or power) of the image signal), and provide the pair of optimal compensation values CMP_X and CMP_Y to the compensation device 111. The compensation device 111 may pre-compensate for the IQ imbalance in the transmitting signal processing path by applying the compensation values CMP_X and CMP_Y, to reduce or suppress generation of the image signal and make the processed signal on the transmitting signal transmitting path 110 to be nearly equal to the original input signal.

In the embodiments of the invention, the power amplifier 117, the antenna and the devices on the transmitting signal processing path 110 may be as a whole regarded as a transmitter, and one or more devices on the feedback signal processing path 120 may be as a whole regarded as a compensation value calibration device to assist the execution of the calibration operation.

According to an embodiment of the invention, in the calibration operation, the compensation device 111 may sequentially process a pair of input signals according to a plurality of pairs of compensation values to generate a plurality of pairs of compensated signals. The transmitting signal processing devices disposed on the transmitting signal processing path 110 may sequentially process the plurality of pairs of compensated signals to generate a plurality of output signals. The output signals may be provided to the digital signal processor 125 through the feedback signal processing path 120 as a plurality of feedback signals, and the digital signal processor 125 may determine a pair of equivalent impairment parameters according to the plurality of pairs of compensation values and the plurality of feedback signals, determine a pair of calibrated compensation values according to the pair of equivalent impairment parameters and provide the pair of calibrated compensation values to the compensation device 111.

When the pair of calibrated compensation values is determined, the calibration operation may be ended. After receiving the pair of calibrated compensation values, the compensation device 111 may process the input signals subsequently received according to the pair of calibrated compensation values. The subsequently received input signals may be the aforementioned pair of cosine signal cos $\omega_m$t and the sine signal sin $\omega_m$t, or other signals to be transmitted by the transmitter circuit 100.

Figure 4:
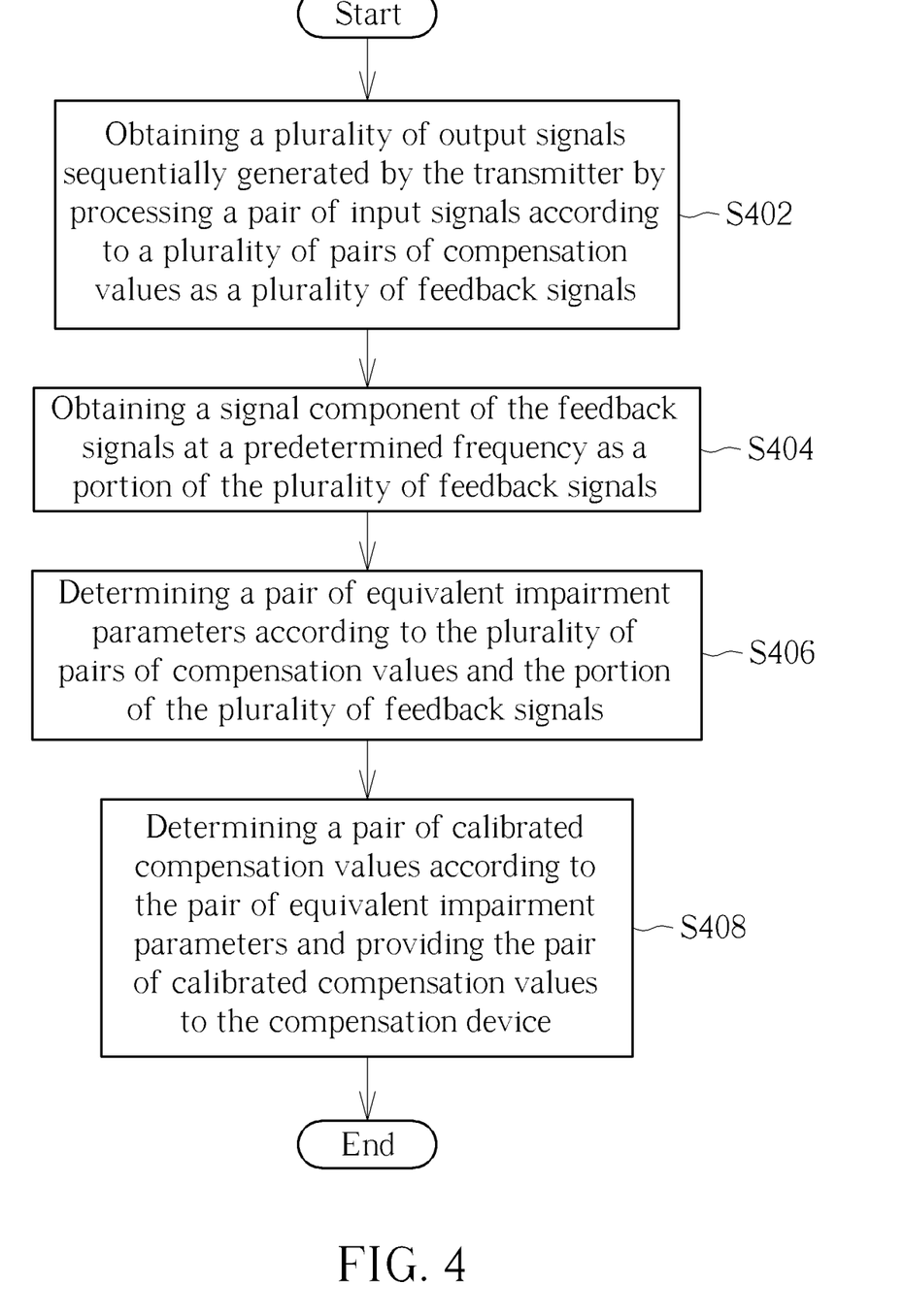
FIG. 4 is a flowchart of a method for calibrating one or more compensation values utilized by a compensation device of a transmitter according to an embodiment of the invention.

FIG. 4 is a flowchart of a method for calibrating one or more compensation values utilized by a compensation device of a transmitter according to an embodiment of the invention. The proposed method comprises the following steps performed by a compensation value calibration device:

Step S402: obtaining a plurality of output signals sequentially generated by the transmitter by processing a pair of input signals according to a plurality of pairs of compensation values as a plurality of feedback signals, wherein each feedback signal corresponds to one of the plurality of pairs of compensation values.

Step S404: obtaining a signal component of the feedback signals at a predetermined frequency as a portion of the plurality of feedback signals.

Step S406: determining a pair of equivalent impairment parameters according to the plurality of pairs of compensation values and the portion of the plurality of feedback signals.

Step S408: determining a pair of calibrated compensation values according to the pair of equivalent impairment parameters and providing the pair of calibrated compensation values to the compensation device.

To be more specific, in the embodiments of the invention, the portion of the feedback signals may obtained by the digital signal processor 125, and the digital signal processor 125 may determine the pair of equivalent impairment parameters according to the plurality of pairs of compensation values and the portion of the plurality of feedback signals, wherein the portion of the plurality of feedback signals is a signal component of the plurality of feedback signals at the predetermined frequency. For example, the FFT device 121 may perform Fast Fourier transform on the plurality of feedback signals received from the transmitter to generate the frequency domain feedback signals, and the digital signal processor 125 may extract the signal component of the plurality of feedback signals at the predetermined frequency from the signals output by the FFT device 121.

Referring back to FIG. 1, according to an embodiment of the invention, when determining the pair of equivalent impairment parameters, the digital signal processor 125 may establish an equivalent signal model at node T, and use the signal component at the predetermined frequency in the equivalent signal model and the signal component at the predetermined frequency of the feedback signal obtained at node T to calculate the pair of equivalent impairment parameters.

Assuming that (Xt,Yt) are the pair of equivalent impairment parameters to be determined in the calibration operation, (Xcmp, Ycmp) are the compensation values to be utilized by the compensation device 111 to perform IQ imbalance compensation on the received signal, that is, the compensation values (CMP_X, CMP_Y) shown in FIG. 1, the relationship between the signal component at the predetermined frequency of the feedback signal obtained at node T and the pair of equivalent impairment parameters (Xt,Yt) and the compensation values (Xcmp, Ycmp) may be expressed as follows:

$$T@-2\omega_m=f(Xt,Yt,Xcmp,Ycmp) \quad \text{Eq. (1)}$$

where the term "$T@-2\omega_m$" represents the signal component at the predetermined frequency (e.g., at the negative frequency $-2\omega_m$) of the feedback signal obtained at node T, and the function $f$ is a function of the negative frequency $-2\omega_m$ from input terminal of the transmitter circuit to the node T. The digital signal processor 125 may establish the function $f$ as shown in Eq. (1) according to at least two pairs of preset compensation values and the feedback signals corresponding to the at least two pairs of preset compensation values, and then determine the pair of equivalent impairment parameters (Xt,Yt).

For example, the digital signal processor 125 may firstly set a first pair of compensation values (Xcmp_1, Ycmp_1), and input a pair of single tone signals with angular frequency $\omega_m$, such as the pair of cosine signal $\cos \omega_m t$ and the sine signal $\sin \omega_m t$ having the angular frequency $\omega_m$ as shown in FIG. 1, at the input terminal of the transmitter. After the signal processing on the transmitting signal processing path 110, the single tone signals are provided to the node T through the feedback signal processing path 120, and the digital signal processor 125 may extract the signal component, e.g., $T@-2\omega_m$=FFT1, at the negative frequency $-2\omega_m$ of the feedback signal obtained at node T. Similarly, the digital signal processor 125 may further set a second pair of compensation values (Xcmp_2, Ycmp_2), and input the same pair of single tone signals at the input terminal of the transmitter. Then, the digital signal processor 125 may extract the signal component, e.g., $T@-2\omega_m$=FFT2, at the negative frequency $-2\omega_m$ of the feedback signal obtained at node T. The following equations Eq. (2) and Eq. (3) are the results obtained after applying the aforementioned results in Eq. (1):

$$T@-2\omega_m=FFT1=f(Xt,Yt,Xcmp\_1,Ycmp\_1) \quad \text{Eq. (2)}$$

$$T@-2\omega_m=FFT2=f(Xt,Yt,Xcmp\_2,Ycmp\_2) \quad \text{Eq. (3)}$$

wherein the signal components FFT1 and FFT2 of the feedback signal at the negative frequency $-2\omega_m$ may respectively be a complex number. The digital signal processor 125 may determine the pair of equivalent impairment parameters (Xt,Yt) after establishing the function $f$.

Figure 5:
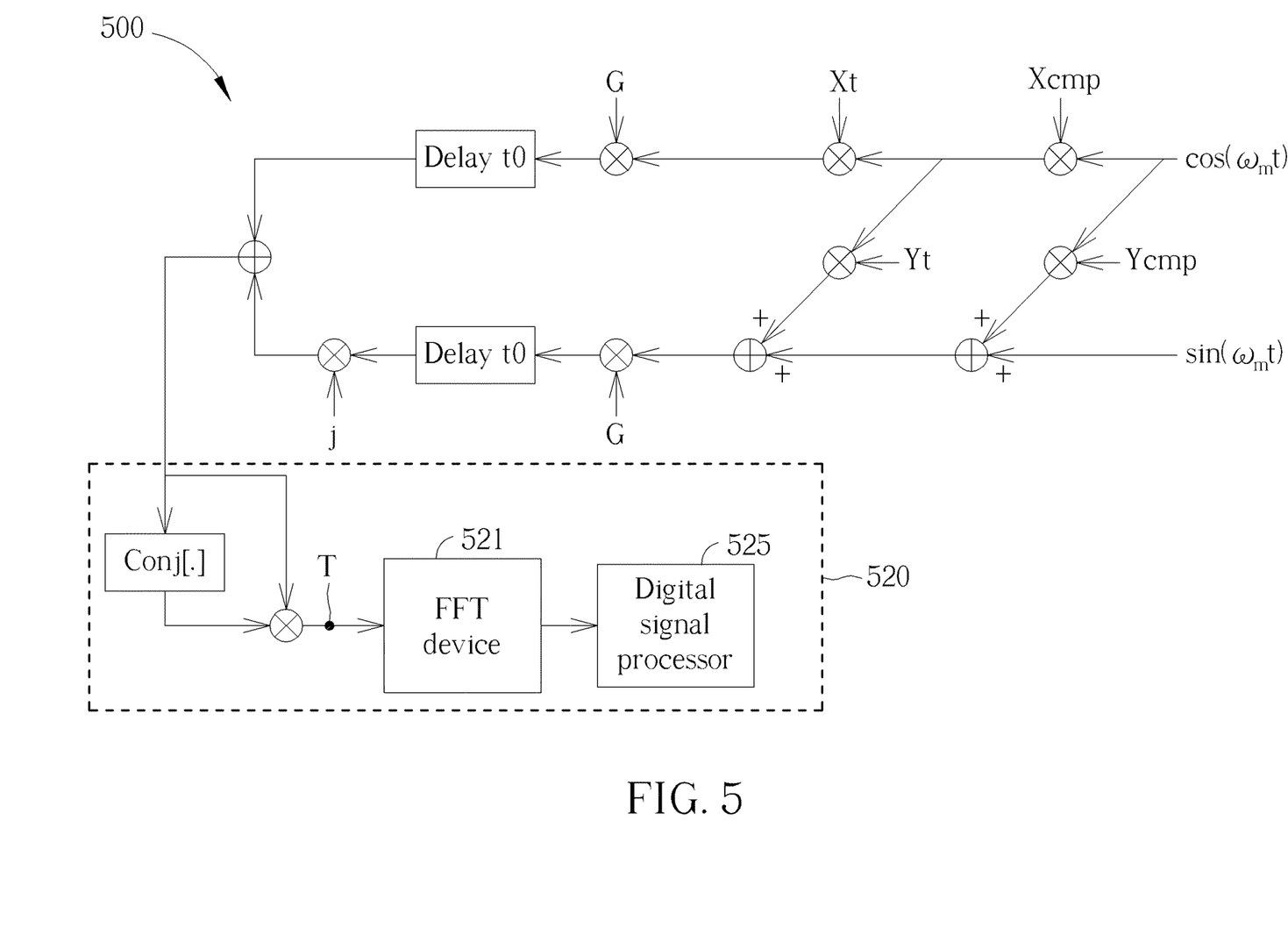
FIG. 5 is an equivalent baseband circuit diagram of the transmitter circuit according to an embodiment of the invention.

FIG. 5 is an equivalent baseband circuit diagram of the transmitter circuit 100 according to an embodiment of the invention. Referring to FIG. 1, in the equivalent circuit diagram illustrated in FIG. 5, the pair of equivalent impairment parameters (Xt,Yt) refers to the IQ imbalance generated on the transmitting signal processing path 110, the gain G refers to the gain generated on the transmitting signal processing path 110, and the delay t0 refers to the delay generated on the transmitting signal processing path 110. In addition, in the equivalent baseband circuit 500, the operations of frequency up-conversion of the mixers 114-1 and 114-2 and the operation of frequency down-conversion of the mixer 124 may be equivalent to the operations of converting the signals in the in-phase channel and the quadrature-phase channel into complex signals and directly transmitting the complex signals to the input terminal of the mixer in the feedback signal processing path 520, wherein one of the signals needs to be conjugated (the operation Conj [.] as shown in FIG. 5), and then multiplied by the other of the signals by the mixer in the feedback signal processing path 520.

In the equivalent baseband circuit 500, the signal at the node S may be expressed as follows:

$$S=G[\cos(\omega_m(t+t0))*Xcmp*Xt+j(\cos(\omega_m(t+t0))* \\ (Xcmp*Yt+Ycmp)+\sin(\omega_m(t+t0)))] \quad \text{Eq. (4)}$$

The signal at the node T may be expressed as follows:

$$T=S*conj(S)$$

Suppose that $\omega_m*t0=p$, and the signal component at the negative frequency $-2\omega_m$ of the signal at node T may be expressed as follows:

$$T@-2\omega_m=G^2e^{-j2p}[(Xcmp^2*Xt^2-1+(Xcmp*Yt+Ycmp) \\ ^2)/4+j*2(Xcmp*Yt+Ycmp)/4] \quad \text{Eq. (5)}$$

In the embodiments of the invention, the equation Eq. (5) may be the function $f$ of negative frequency $-2\omega_m$ with respect to the input signal tone signals which travels from the input terminal of the equivalent baseband circuit 500 to the node T, and the digital signal processor 125 may establish the function $f$ by using the equivalent baseband circuit 500, or, establish the relation between the negative frequency $-2\omega_m$ signal component of the signal at the node T and the pair of equivalent impairment parameters (Xt,Yt), the pair of compensation values (Xcmp, Ycmp), the gain G and the delay t0 as shown in equation Eq. (5) by using the using the equivalent baseband circuit 500. After establishing the function $f$ or the aforementioned relation, the digital signal processor 125 may further determine the pair of equivalent impairment parameters (Xt,Yt) and find out the pair of optimal compensation values (Xcmp, Ycmp) which optimize the IMR based on the flow illustrated in FIG. 6. In the embodiments of the invention, the optimal compensation values are the aforementioned calibrated compensation values, as the calibrated (or, the optimal) compensation values (CMP_X, CMP_Y) shown in FIG. 1. In the following paragraphs, the calibrated compensation values (i.e., the optimal compensation values) are collectively represented by (Xopt, Yopt).

Figure 6:
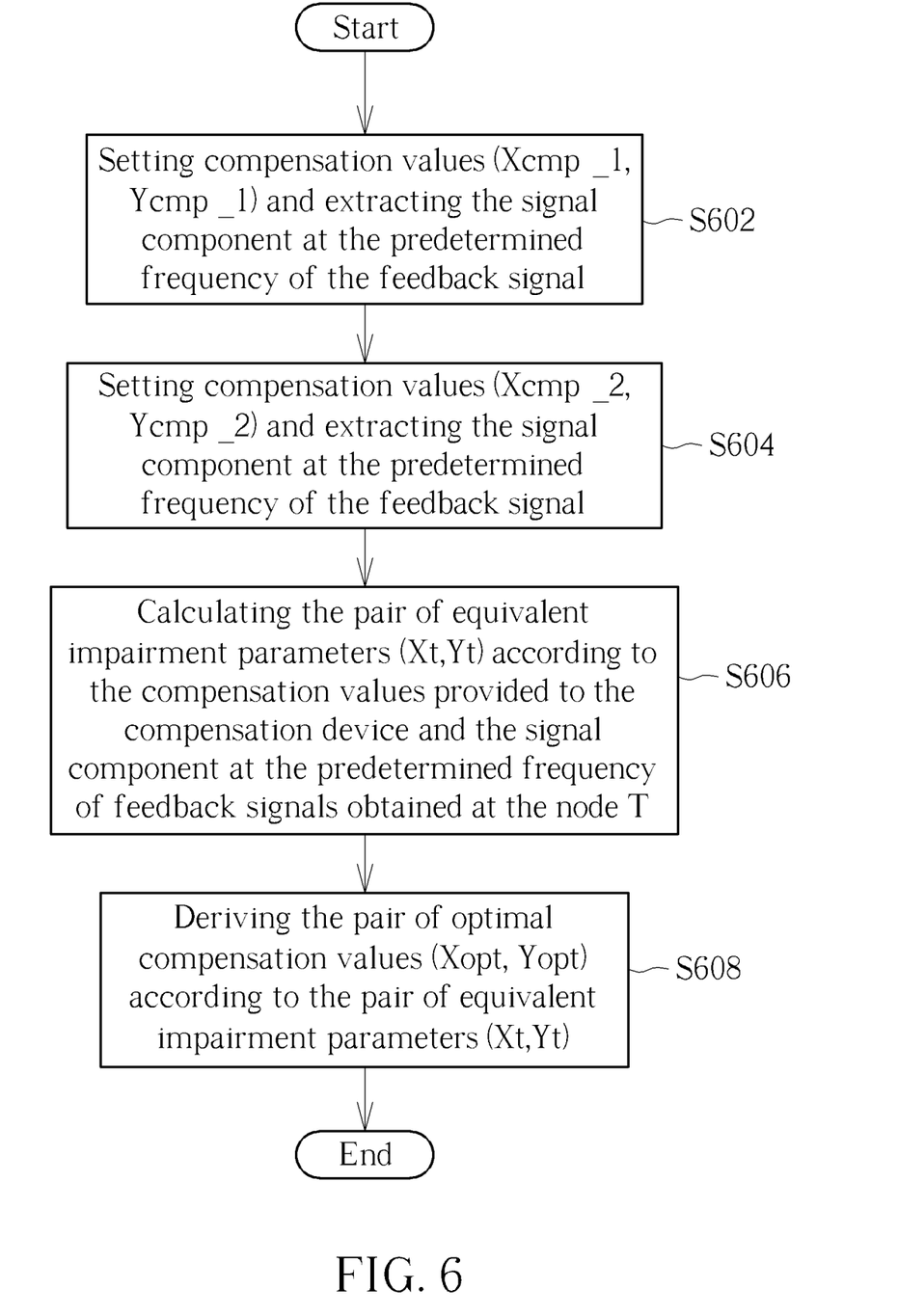
FIG. 6 is a flow chart showing detailed steps in a calibration operation according to an embodiment of the invention.

FIG. 6 is a flow chart showing detailed steps in a calibration operation according to an embodiment of the invention, comprising the following steps performed by the digital signal processor 125:

Step S602: setting a first pair of compensation values (Xcmp_1, Ycmp_1), inputting a pair of single tone signals with angular frequency $\omega_m$, such as the pair of cosine signal $\cos \omega_m t$ and the sine signal $\sin \omega_m t$ having the angular frequency $\omega_m$ as shown in FIG. 1, at the input terminal of the transmitter, and extracting the signal component at the predetermined frequency (e.g., the negative frequency $-2\omega_m$) of the feedback signal obtained at node T, e.g., $T@-2\omega_m$=FFT1. As discussed above, after the signal processing on the transmitting signal processing path 110, the single tone signals are provided to the node T through the feedback signal processing path 120. In an embodiment of the invention, the first pair of compensation values (Xcmp_1, Ycmp_1) may be set to (0,1), and assuming that FFT1=C+jD, the relation between the parameters C, D, p, the gain G and the pair of equivalent impairment parameters (Xt,Yt) may be obtained after applying the function shown in the equation Eq. (5).

Step S604: setting a second pair of compensation values (Xcmp_2, Ycmp_2), inputting the same pair of single tone signals at the input terminal of the transmitter as the input signals and extracting the signal component at the predetermined frequency (e.g., the negative frequency $-2\omega_m$) of the feedback signal obtained at node T, e.g., $T@-2\omega_m$=FFT2. In an embodiment of the invention, the second pair of compensation values (Xcmp_2, Ycmp_2) may be set to (1,0), and assuming that FFT2=E+jF, the relation between the parameters E, F, p, the gain G and the pair of equivalent impairment parameters (Xt,Yt) may be obtained after applying the function shown in the equation Eq. (5).

Step S606: calculating the pair of equivalent impairment parameters (Xt,Yt) according to the pairs of compensation values provided to the compensation device 111 and the signal component at the predetermined frequency of feedback signals obtained at the node T. According to an embodiment of the invention, the digital signal processor 125 may combine the parameters obtained in steps S602 and S604 with the preset compensation values (Xcmp, Ycmp) being applied in different ways, or combine the signal components at the predetermined frequency of feedback signals as those obtained in steps S602 and S604 in different ways, to further derive different relations, and thereby deriving the pair of equivalent impairment parameters (Xt, Yt).

According to an embodiment of the invention, the digital signal processor 125 may derive the relations between the pair of equivalent impairment parameters (Xt,Yt) and the values of parameters C, D, E and F (that is, the FFT results) according to the aforementioned different ways of combination as follows:

$$Yt=(C*E+D*F)/(C^2+D^2) \qquad \text{Eq. (6)}$$

$$Xt^2=1-Yt^2+2*(D*E-C*F)/(C^2+D^2) \qquad \text{Eq. (7)}$$

It is to be noted that, the relations between the pair of equivalent impairment parameters (Xt,Yt) and the values of parameters C, D, E and F (that is, the FFT results) as shown in equations Eq. (6) and Eq. (7) are the results obtained by setting the pairs of compensation values to (0,1) and (1,0). A person of ordinary skill in the art will appreciate that in steps S602 and S604, the compensation values may also be set to other values different from (0,1) and (1,0), and the relations between the pair of equivalent impairment parameters (Xt,Yt) and the FFT results obtained based on different settings of the compensation values may be different from the embodiments discussed above. Therefore, the relations between the pair of equivalent impairment parameters (Xt, Yt) and the FFT results derived in step S606 may be different from the aforementioned equations Eq. (6) and Eq. (7). However, the relations between the pair of equivalent impairment parameters (Xt,Yt) and the FFT results with respect to different settings of the compensation values may still be obtained in the same manner.

Step S608: deriving the pair of optimal compensation values (Xopt, Yopt) according to the pair of equivalent impairment parameters (Xt,Yt).

According to an embodiment of the invention, the digital signal processor 125 may determine the pair of optimal compensation values (Xopt, Yopt) according to a calculation result of the pair of equivalent impairment parameters (Xt,Yt) and an identity matrix.

To be more specific, assuming that when a pair of input signals, hereinafter using the symbols I and Q to respectively represent the input signal in the in-phase channel and the input signal in the quadrature-phase channel, is input to the transmitter circuit, and assuming that the same signals I and Q as the input ones are obtained after applying the pair of optimal compensation values (Xopt, Yopt) to the transmitter circuit and after the input signals have undergone the function of the pair of equivalent impairment parameters (Xt,Yt), a relation as expressed in the following equation Eq. (8) may be established:

$$\begin{bmatrix} I \\ Q \end{bmatrix} = \begin{bmatrix} X_t & 0 \\ Y_t & 1 \end{bmatrix} \begin{bmatrix} X_{opt} & 0 \\ Y_{opt} & 1 \end{bmatrix} \begin{bmatrix} I \\ Q \end{bmatrix} \qquad \text{Eq. (8)}$$

From the equation Eq. (8), it is to be understood that the result obtained by multiplying the matrix of optimal compensation values and the matrix of equivalent impairment parameters (Xt,Yt) together will be an identity matrix as follows:

$$\begin{bmatrix} X_t & 0 \\ Y_t & 1 \end{bmatrix} \begin{bmatrix} X_{opt} & 0 \\ Y_{opt} & 1 \end{bmatrix} = \begin{bmatrix} 1 & 0 \\ 0 & 1 \end{bmatrix} \qquad \text{Eq. (9)}$$

Therefore, the digital signal processor 125 may directly derive the pair of optimal compensation values (Xopt, Yopt) based on the relations expressed as follows:

$$X_{opt}=1/X_t \qquad \text{Eq. (10)}$$

$$Y_{opt}=-Y_t/X_y \qquad \text{Eq. (11)}$$

After obtaining the pair of optimal compensation values (Xopt, Yopt), the digital signal processor 125 may provide the pair of optimal compensation values to the compensation device 111 as a pair of calibrated compensation values. Upon receiving the pair of calibrated compensation values, the compensation device 111 may further process the input signals subsequently received (e.g., the pair of input signals respectively received at the input terminals of the in-phase channel and the quadrature-phase channel) according to the pair of calibrated compensation values CMP_X and CMP_Y (that is, the optimal compensation values (Xopt, Yopt)). In the embodiments of the invention, by adjusting the input signals based on the calibrated compensation values to compensate for the IQ imbalance on the transmitting signal processing path, generation of the image signal may be reduced or even suppressed, thereby increasing the IMR or even maximize the IMR on the transmitting signal processing path 110. Therefore, the pair of calibrated compensation values may also be a pair of compensation values that make a processed signal (e.g., the feedback signal obtained at the node T) on the feedback signal processing path 120 to have minimum energy at the predetermined frequency.

In the embodiments of the invention, the digital signal processor 125 may find out the pair of optimal compensation values (Xopt, Yopt) only through four steps as shown in FIG. 6. Therefore, as compared with the existing technology which generally has to involve multiple iterations or training operations to find out the optimal compensation values, the proposed method is able to find out the optimal pair of compensation values CMP_X and CMP_Y that optimize the image rejection ratio more quickly in the calibration operation.

Especially, every time when the communication channel of a communication device changes, the transmitter circuit (e.g., the transmitter circuit 100) configured therein needs to recalibrate the compensation values CMP_X and CMP_Y due to the change in the oscillation frequency LO. When the communication channel changes frequently, calibration of the compensation values in the existing technology will become a burden since the operation is very time-consuming. The invention solve this problem, because the proposed method for calibrating one or more compensation values and the associated compensation value calibration device and transmitter circuit are able to quickly find out the optimal compensation values CMP_X and CMP_Y corresponding to every change of the oscillation frequency LO, thereby significantly reducing the time required for calibration the compensation values in channel or frequency change operations, and further effectively reducing the aforementioned burden.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter circuit, comprising:
    a compensation device, disposed on a transmitting signal processing path and configured to sequentially process a pair of input signals according to a plurality of pairs of compensation values to generate a plurality of pairs of compensated signals;
    at least one transmitting signal processing device, disposed on the transmitting signal processing path and configured to sequentially process the plurality of pairs of compensated signals to generate a plurality of output signals; and
    a digital signal processor, disposed on a feedback signal processing path and coupled to the compensation device,
    wherein the feedback signal processing path is coupled to an output terminal of the transmitting signal processing path, the plurality of output signals are provided to the digital signal processor through the feedback signal processing path as a plurality of feedback signals, and the digital signal processor performs a calibration operation according to the plurality of pairs of compensation values and the plurality of feedback signals, and
    wherein in the calibration operation, the digital signal processor determines a pair of equivalent impairment parameters according to the plurality of pairs of compensation values and the plurality of feedback signals, determines a pair of calibrated compensation values according to the pair of equivalent impairment parameters and provides the pair of calibrated compensation values to the compensation device.

2. The transmitter circuit of claim 1, wherein the digital signal processor obtains a portion of the plurality of feedback signals, the portion of the plurality of feedback signals is a signal component at a predetermined frequency of the plurality of feedback signals, and the digital signal processor determines the pair of equivalent impairment parameters according to the plurality of pairs of compensation values and the portion of the plurality of feedback signals.

3. The transmitter circuit of claim 2, wherein the pair of input signals is a pair of single tone signals with an input frequency, and an absolute value of the predetermined frequency is twice the input frequency.

4. The transmitter circuit of claim 2, wherein the pair of calibrated compensation values is a pair of compensation values that make a processed signal on the feedback signal processing path to have minimum energy at the predetermined frequency.

5. The transmitter circuit of claim 1, wherein after receiving the pair of calibrated compensation values, the compensation device is further configured to process the pair of input signals subsequently received according to the pair of calibrated compensation values.

6. The transmitter circuit of claim 1, wherein the digital signal processor is configured to determine the pair of calibrated compensation values according to a calculation result of the pair of equivalent impairment parameters and an identity matrix.

7. A compensation value calibration device, for calibrating one or more compensation values utilized by a compensation device in a transmitter, comprising:
    a Fast Fourier Transform (FFT) device, configured to perform Fast Fourier transform on a plurality of feedback signals received from the transmitter to generate a plurality of frequency domain feedback signals, wherein each feedback signal corresponds to one of a plurality of pairs of compensation values; and
    a digital signal processor, coupled to the compensation device and the FFT device and configured to determine a pair of calibrated compensation values in a calibration operation according to the plurality of pairs of compensation values and the plurality of frequency domain feedback signals and provide the pair of calibrated compensation values to the compensation device,
    wherein the digital signal processor obtains a signal component of the plurality of feedback signals at a predetermined frequency as a portion of the plurality of feedback signals according to the plurality of frequency domain feedback signals, determines a pair of equivalent impairment parameters according to the plurality of pairs of compensation values and the portion of the plurality of feedback signals and determines the pair of calibrated compensation values according to the pair of equivalent impairment parameters.

8. The compensation value calibration device of claim 7, wherein an absolute value of the predetermined frequency is twice an input frequency of an input signal of the transmitter.

9. The compensation value calibration device of claim 7, wherein the pair of calibrated compensation values is a pair of compensation values that make a processed signal generated by the transmitter in response to an input signal to have minimum energy at the predetermined frequency.

10. The compensation value calibration device of claim 7, wherein the digital signal processor is configured to determine the pair of calibrated compensation values according to a calculation result of the pair of equivalent impairment parameters and an identity matrix.

11. A method for calibrating one or more compensation values utilized by a compensation device in a transmitter, comprising:
    obtaining a plurality of output signals sequentially generated by the transmitter by processing a pair of input signals according to a plurality of pairs of compensation values as a plurality of feedback signals, wherein each feedback signal corresponds to one of the plurality of pairs of compensation values;
    obtaining a signal component of the plurality of feedback signals at a predetermined frequency as a portion of the plurality of feedback signals;
    determining a pair of equivalent impairment parameters in a calibration operation according to the plurality of pairs of compensation values and the portion of the plurality of feedback signals; and
    determining a pair of calibrated compensation values according to the pair of equivalent impairment parameters and providing the pair of calibrated compensation values to the compensation device.

12. The method of claim 11, wherein the pair of input signals is a pair of single tone signals with an input frequency, and an absolute value of the predetermined frequency is twice the input frequency.

13. The method of claim 12, wherein the pair of calibrated compensation values is a pair of compensation values that make a processed signal on a feedback signal processing path of the transmitter to have minimum energy at the predetermined frequency.

14. The method of claim 11, further comprising:
processing the pair of input signals subsequently received according to the pair of calibrated compensation values.

15. The method of claim 11, wherein the pair of calibrated compensation values is determined according to a calculation result of the pair of equivalent impairment parameters and an identity matrix.

* * * * *